(12) United States Patent
Sollars

(10) Patent No.: US 9,145,072 B2
(45) Date of Patent: Sep. 29, 2015

(54) POWER DISC STYLE SEAT RECLINER

(71) Applicant: Everett Sollars, Brownstown, MI (US)

(72) Inventor: Everett Sollars, Brownstown, MI (US)

( * ) Notice: Subject to any disclaimer, the term of this patent is extended or adjusted under 35 U.S.C. 154(b) by 172 days.

(21) Appl. No.: 14/048,632

(22) Filed: Oct. 8, 2013

(65) Prior Publication Data

US 2014/0035340 A1 Feb. 6, 2014

Related U.S. Application Data

(63) Continuation-in-part of application No. 12/954,217, filed on Nov. 24, 2010, now Pat. No. 8,550,559.

(51) Int. Cl.
*B60N 2/02* (2006.01)
*B60N 2/22* (2006.01)

(52) U.S. Cl.
CPC ....... *B60N 2/2236* (2013.01); *Y10T 403/32073* (2015.01); *Y10T 403/32319* (2015.01)

(58) Field of Classification Search
USPC .................... 297/356, 354.1, 354.13, 362.11, 297/378.12, 378.14, 354.12, 376; 16/324; 403/59, 61, 91, 103, 113
See application file for complete search history.

(56) References Cited

U.S. PATENT DOCUMENTS

| 152,476 | A | * | 6/1874 | Frizell | 403/113 |
|---|---|---|---|---|---|
| 437,598 | A | * | 9/1890 | Higgins | 403/113 |
| 555,201 | A | * | 2/1896 | Ascheck | 403/61 |
| 1,337,817 | A | * | 4/1920 | Bode | 403/113 |
| 2,359,490 | A | * | 10/1944 | Rappl | 49/140 |
| 2,554,292 | A | * | 5/1951 | Brown | 74/551.5 |
| RE23,744 | E | * | 11/1953 | Magida | 482/118 |
| 2,861,501 | A | * | 11/1958 | Strelakos | 359/802 |
| 3,309,121 | A | * | 3/1967 | Fentiman | 403/176 |
| 3,352,580 | A | * | 11/1967 | Kurz et al. | 403/93 |
| 3,397,903 | A | * | 8/1968 | Archdale et al. | 403/113 |
| 3,740,791 | A | * | 6/1973 | Bulin | 16/346 |
| 4,882,807 | A | * | 11/1989 | Frye et al. | 16/225 |
| 4,953,259 | A | * | 9/1990 | Frye et al. | 16/225 |
| 5,029,669 | A | * | 7/1991 | Lew et al. | 182/42 |
| 5,116,102 | A | * | 5/1992 | Chaundy | 297/357 |
| 5,234,255 | A | * | 8/1993 | Kawakita | 297/354.12 |
| 5,584,311 | A | * | 12/1996 | Schaefer | 135/128 |
| 5,909,923 | A | * | 6/1999 | DeKraker | 297/285 |
| 5,956,810 | A | * | 9/1999 | Spaeth | 16/358 |
| 6,062,584 | A | * | 5/2000 | Sabol | 280/607 |
| 6,186,595 | B1 | * | 2/2001 | Ward et al. | 297/378.1 |
| 6,203,051 | B1 | * | 3/2001 | Sabol | 280/607 |
| 6,428,104 | B1 | * | 8/2002 | Sakamoto et al. | 297/362.11 |
| 8,104,141 | B2 | * | 1/2012 | Yamashita | 16/239 |
| 8,167,250 | B2 | * | 5/2012 | White | 248/49 |
| 2002/0041120 | A1 | * | 4/2002 | Glaspie et al. | 297/374 |
| 2004/0113480 | A1 | * | 6/2004 | Reed et al. | 297/408 |
| 2010/0244408 | A1 | * | 9/2010 | Dean et al. | 280/647 |
| 2012/0193946 | A1 | * | 8/2012 | Robertson | 297/68 |

FOREIGN PATENT DOCUMENTS

| WO | 8802716 | | 4/1988 | | |
|---|---|---|---|---|---|
| WO | WO 8802716 A1 | * | 4/1988 | | B62D 27/06 |

* cited by examiner

*Primary Examiner* — David E Allred
(74) *Attorney, Agent, or Firm* — Gifford, Krass, Sprinkle, Anderson & Citkowski, P.C.

(57) ABSTRACT

A power disc style seat reclining mechanism for a vehicle seat includes a seat base fixed mounted guide disc pivotally connected to a set of pivotal discs. The pivotal discs include an internal disc segment and a seat back attaching member. Within the internal disc is a connection features and linkage that may be actuated by a center shaft that is driven by a motor. When the internal disc is rotated, the desired seat back position is the end result as the motion is discontinued.

20 Claims, 5 Drawing Sheets

POWER DISC STYLE SEAT RECLINER

CROSS-REFERENCE TO RELATED APPLICATIONS

This application is a continuation-in-part of and claims priority benefit to pending non-provisional patent application Ser. No. 12/954,217, filed Nov. 24, 2010, the subject matter of which is incorporated by reference in its entirety.

BACKGROUND OF THE INVENTION

The present invention relates to a seat reclining mechanism and, more particularly, to a seat reclining mechanism that positions the seat back to a desired angle in a motor vehicle.

Current designs for seating mechanisms in motor vehicles are large, complicated, costly to manufacture and cannot be operated with power. These conventional seating mechanisms often use gear teeth and are noisy and weak relative to current design requirements.

As can be seen, there is a need for a small, simple, lightweight and quietly operated seat reclining mechanism that may be used with both power and manually adjusted seat backs.

SUMMARY OF THE INVENTION

In one aspect of the present invention, a seat reclining mechanism comprises a seat base mounted disc adapted to be attached to a seat base; a seat back mounted disc adapted to be attached to a seat back; at least two base mounted disc slots in the seat base mounted disc; at least two back mounted disc slots in the seat back mounted disc; an internal disc sandwiched between the seat back mounted disc and the seat base mounted disc; at least two internal disc slots in the internal disc; and a pin extending through each of the at least two base mounted disc slots, through each of the at least two internal disc slots and through each of the at least two back mounted disc slots.

In another aspect of the present invention, a seat reclining mechanism comprises a seat base mounted disc adapted to be attached to a seat base; a seat back mounted disc adapted to be attached to a seat back; two base mounted disc slots in the seat base mounted disc; two back mounted disc slots in the seat back mounted disc; a internal disc sandwiched between the seat back mounted disc and the seat base mounted disc; two internal disc slots in the internal disc; a pin extending through each of the at least two base mounted disc slots, through each of the at least two internal disc slots and through each of the at least two back mounted disc slots; and a central shaft attached to the internal disc, the central shaft passing through the seat base mounted disc and the seat back mounted disc, wherein the base mounted disc slots, the internal disc slots and the back mounted disc slots align over movement of the seat back from an upright to a reclining position.

The present disclosure further provides for a seat reclining mechanism including: a seat base mounted disc adapted to be attached to a seat base; a seat back mounted disc adapted to be attached to a seat back; a plurality of elongated base mounted disc slots formed in the seat base mounted disc; a plurality of back mounted disc receiving holes formed in the seat back mounted disc; an internal disc sandwiched between the seat back mounted disc and the seat base mounted disc, the internal disc having a plurality of elongated internal disc slots formed in the internal disc; and a plurality of links. Each link includes a body, a load-bearing pin and an adjustment pin, wherein the load-bearing pin and the adjustment pin are positioned offset from each other and extend in opposite axial directions. The load-bearing pin engages a receiving hole of the back mounted disc. The adjustment pin extends in an opposite direction from the load-bearing pin passing through an elongated slot of the internal disc and engaging the seat base mounted disc through a seat mounted disc slot. Rotation of the internal disc causes the back mounted disc to rotate relative to the base mounted disc by sliding the adjustment pins of the links along the base mounted disc slots.

In an example, the plurality of elongated base mounted disc slots include three elongated base mounted disc slots, the plurality of back mounted disc receiving holes include three back mounted disc receiving holes, the plurality of elongated internal disc slots include three elongated internal disc slots and the plurality of links include three links, wherein each slot and hole are formed on the corresponding disc spaced apart radially with respect to a center hole formed on the corresponding disc and equidistant from adjacent holes or slots. A central shaft can be attached to the internal disc passing through the seat base mounted disc and the seat back mounted disc. The central shaft can be adapted to be driven by a motor to adjust the position of the seat back.

The plurality of base mounted disc slots can be arcuate slots positioned around a central opening. The plurality of internal disc slots can be positioned equidistant from each other around the central shaft and elongated perpendicular to the central shaft. The plurality of back mounted disc receiving holes can be spaced apart equidistant from each other around a central opening for receiving the central shaft. The body of the link can form a shoulder around the load-bearing pin and the adjustment pin and the shoulder can be adapted to retain each pin in position. The body of the link can be elongated and parallel with a plane defined by the seat back mounted disc and the load-bearing pin and the adjustment pin extend perpendicular with respect to the body. In an example, a circular ridge on the seat base mounting disc is provided, the circular ridge adapted to house the internal disc therewithin.

In a further example, the present disclosure further provides for a seat reclining mechanism including: a seat base mounted disc adapted to be attached to a seat base; a seat back mounted disc adapted to be attached to a seat back; a plurality of elongated base mounted disc slots formed in the seat base mounted disc; a plurality of back mounted disc receiving holes formed in the seat back mounted disc; an internal disc sandwiched between the seat back mounted disc and the seat base mounted disc, the internal disc having a plurality of elongated internal disc slots formed in the internal disc; and a plurality of links. Each link includes a body, a load-bearing pin and an adjustment pin. The load-bearing pin and the adjustment pin each extend in opposite direction wherein the load-bearing pin engages a receiving hole of the back mounted disc, and the adjustment pin extends in an opposite direction from the load-bearing pin passing through an elongated slot of the internal disc and engaging the seat base mounted disc through a seat mounted disc slot. A central shaft is attached to the internal disc and the central shaft passes through the seat base mounted disc and the seat back mounted disc. The base mounted disc slots, the internal disc slots and the back mounted disc receiving holes align over movement of the seat back from an upright to a reclining position. The rotation of the internal disc causes the back mounted disc to rotate relative to the base mounted disc by sliding the adjustment pin of the link along the slots. The body of the link can form a shoulder around the load-bearing pin and the adjustment pin and the shoulder is adapted to retain each pin in position. The central shaft can be adapted to be driven by a motor to adjust the position of the seat back.

In yet a further example, the present disclosure provides for a seat reclining mechanism including: a seat base mounted disc adapted to be attached to a seat base, the seat base mounted disc having a plurality of seat base connection features; a seat back mounted disc adapted to be attached to a seat back, the seat back mounted disc having at least one seat back connection features; an internal disc sandwiched between the seat back mounted disc and the seat base mounted disc, the internal disc having at least one elongated internal disc slot formed in the internal disc; and at least a link including a body and a pair of pins positioned offset from each other and extending in opposite axial directions. At least one of the pins engages the seat back connection feature and the other engages the seat base connection feature and one of the pins passes through the elongated internal disc Rotation of the internal disc causes the back mounted disc to rotate relative to the base mounted disc through the connection of the links with the connection features of the back mounted disc and the base mounted disc. The connection features can be holes or slots adapted to receive the pins of the links. The pins of the links can be adjustment pins and load-bearing pins extending opposite and away from each other.

These and other features, aspects and advantages of the present invention will become better understood with reference to the following drawings, description and claims.

DETAILED DESCRIPTION OF THE INVENTION

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Various inventive features are described below that can each be used independently of one another or in combination with other features.

Broadly, an embodiment of the present invention provides a power disc style seat reclining mechanism for a vehicle seat. The seat reclining mechanism includes a seat base fixed mounted guide disc pivotally connected to a set of pivotal discs. The pivotal discs include an internal disc segment and a seat back attaching member. Within the internal disc is a set of slots that may be actuated by a center shaft that is driven by a motor. When the internal disc is rotated, the desired seat back position is the end result as the motion is discontinued.

Figure 1:
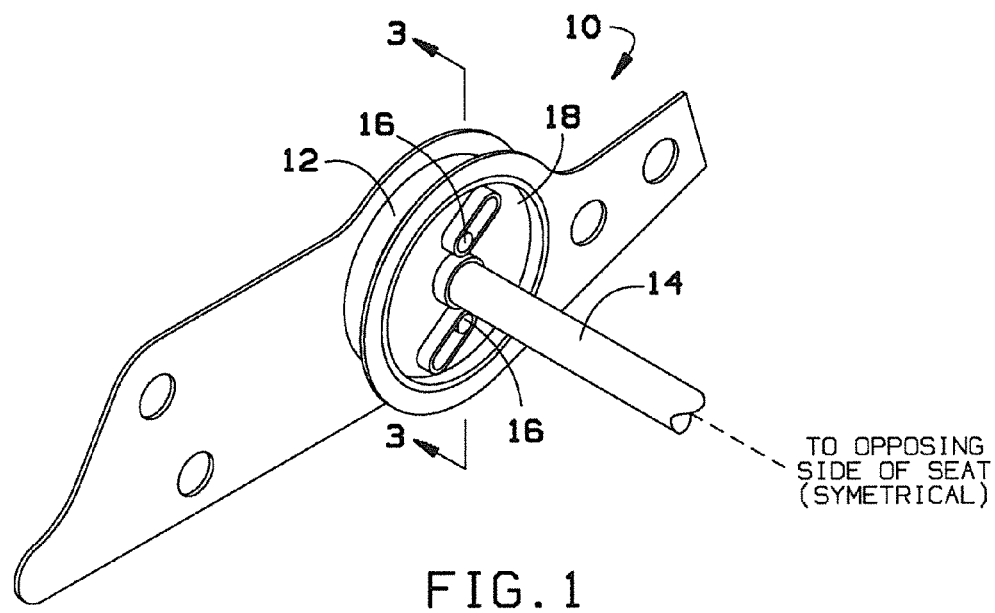
FIG. 1 is a perspective view of a power disc style seat reclining mechanism according to an exemplary embodiment of the present invention.
Figure 2:
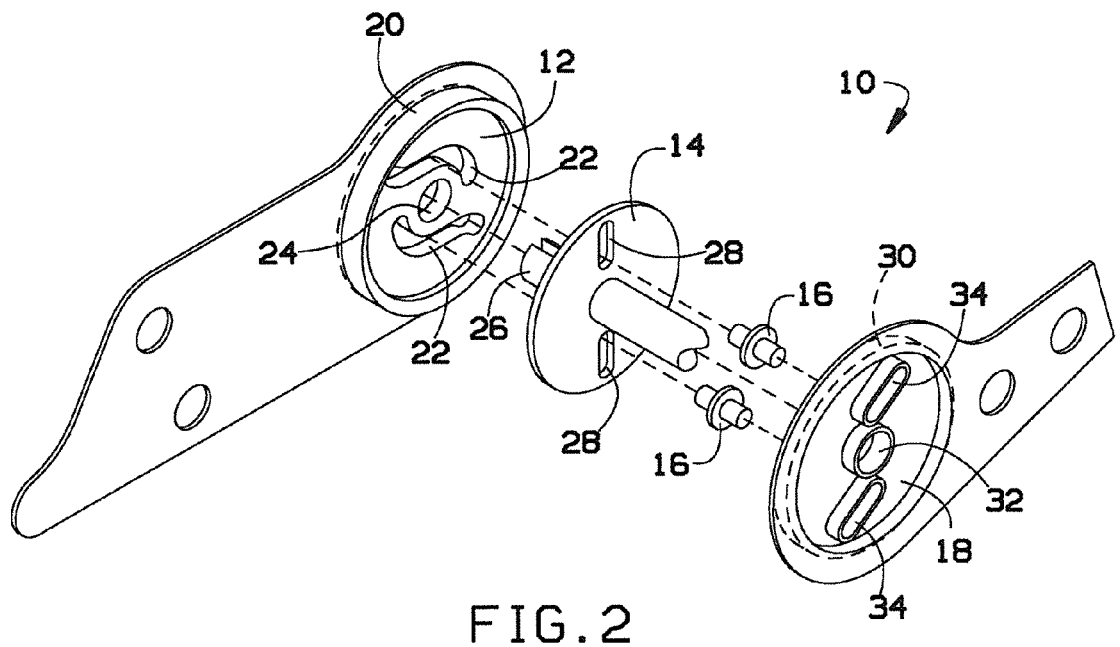
FIG. 2 is an exploded view of the seat reclining mechanism of FIG. 1.
Figure 3:
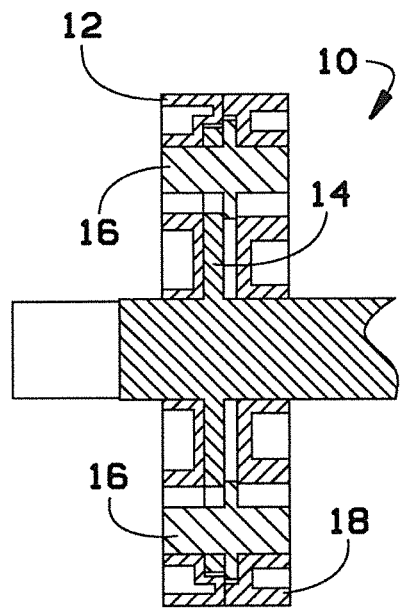
FIG. 3 is a cross-sectional view taken along line 3-3 of FIG. 1.
Figure 4:
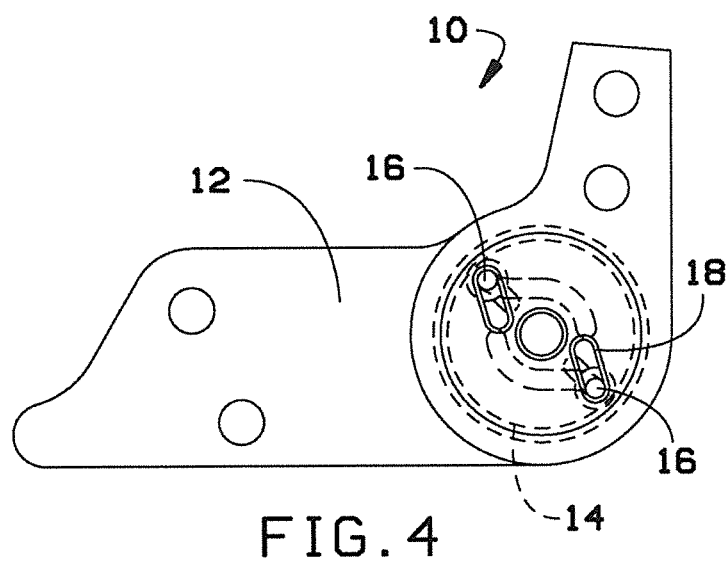
FIG. 4 is a side view of the seat reclining mechanism of FIG. 1 in a sitting position.
Figure 5:
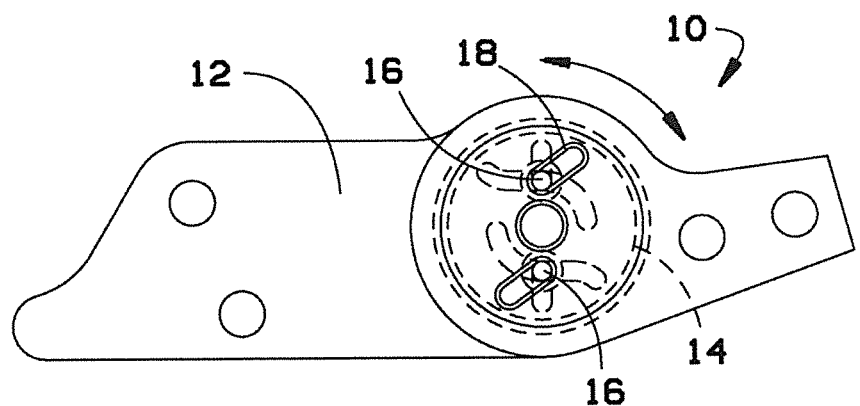
FIG. 5 is a side view of the seat reclining mechanism of FIG. 1 in a reclining position.

Referring to FIGS. 1 through 5, a power disc style seat reclining mechanism 10 (also referred to seat reclining mechanism 10) may include a seat base mounted guide disc 12. The seat base mounted guide disc 12 may be fixed to a seat base (not shown), such as a seat base of an automotive seat. A circular ridge 20 may be formed in one end of the seat base mounted guide disc 12. A hole 24 may be formed in a central area of the circular ridge 20. Two slots 22 may be formed on each side of the hole 24. The slots 22 may be arcuate shaped in an elongated S-shape, as shown in FIGS. 2, 4 and 5.

The circular ridge 20 may be adapted to receive an internal disc 14. The internal disc 14 may include a center shaft 26. One end of the center shaft 26 may fit into the hole 24 in the seat base mounted guide disc 12. The other end of the center shaft 26 may pass through a seat back mounted disc 18 and continue to the other side of the seat (not shown), where a similar mechanism 10 may be disposed. Slots 28 may be cut in the internal disc 14. The slots 28 may align with the slots 22 in the mounted guide disc.

The seat back mounted disc 18 may include a circular ridge 30 adapted to mate with the circular ridge 20 of the seat base mounted guide disc 12. The seat back mounted disc 18 may include a hole 32 adapted to receive the center shaft 26 of the internal disc 14. The seat back mounted disc 18 may include slots 34. The slots 34 may align with the slots 28 in the internal disc 14 and the slots 22 in the seat base mounted guide disc 12. Load bearing pins 16 may extend through the slots 22, 28, 34.

The internal disc 14 may slide the load bearing pins 16 into a desired seat back position that is selected. A shoulder feature on the pins 16 and a washer/bushing may support the pin traveling in the slots 22, 28, 34. When the pins 16 are driven, the mechanism may stop at the desired seat back position and the shared opposing slots act as a locking mechanism. The load bearing pins 16 that are engaged into the slot 34 of the seat back mounted disc 18 may be where the focus of the load is guided, which is dispersed to the seat base mounted disc 12. The geometric travel of the motor driven internal disc 14 may have no transferred load due to the locking effect of the opposing slots 22, 34 of the seat base mounted disc 12 and the seat back mounted disc 18. Pull test loads are not aligned to the rotational pivoting required to change the seat back positioning. Springs (not shown) may be added to keep the assembly counterbalanced under tension between the seat base mounted disc 12 and the seat back mounted disc 18.

While the above description and drawings describe two slots in each of the seat base mounted disc 12, the internal disc 14 and the seat back mounted disc 18, other configurations may be within the scope of the present invention. For example, three slots and pins may be used to provide additional load bearing capabilities.

Figure 6:
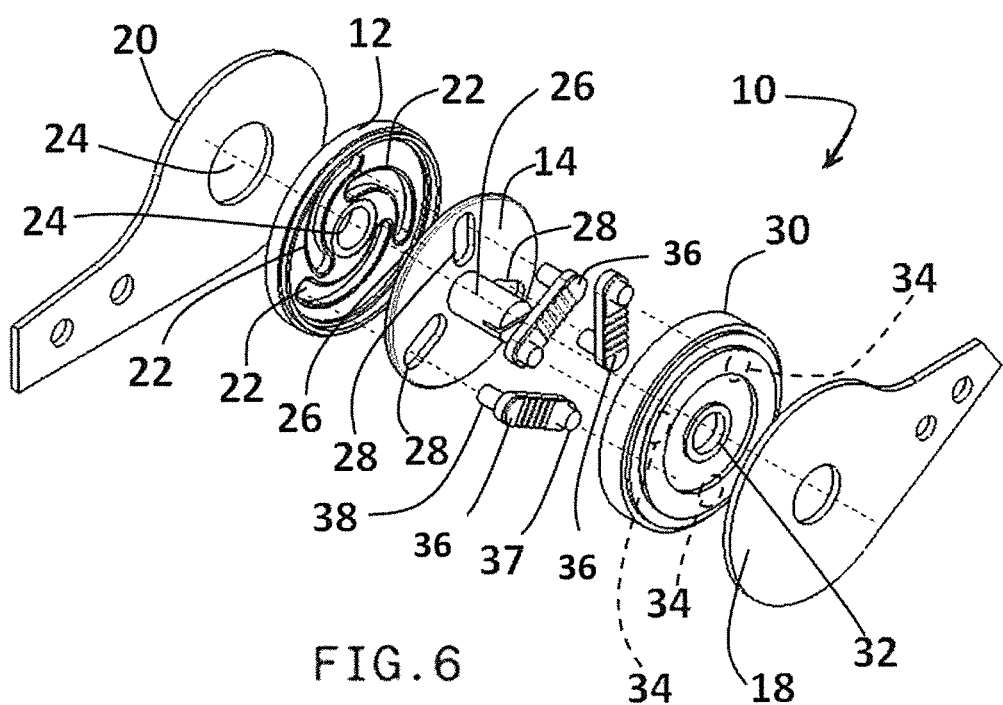
FIG. 6 is a perspective exploded view of a further embodiment of a power disc style seat reclining mechanism according to the present invention
Figure 7:
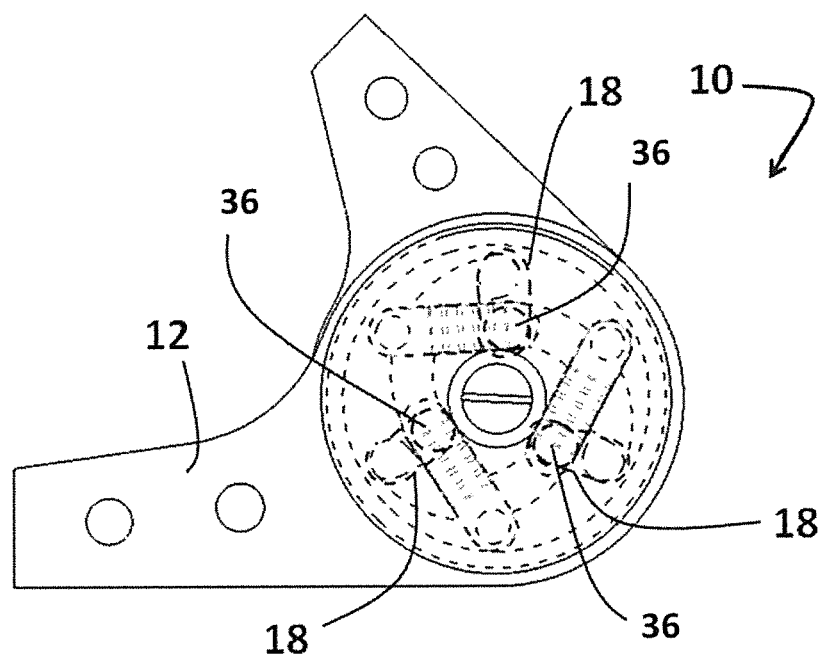
FIG. 7 is a side view of the seat reclining mechanism of FIG. 6 in a r a sitting position.
Figure 8:
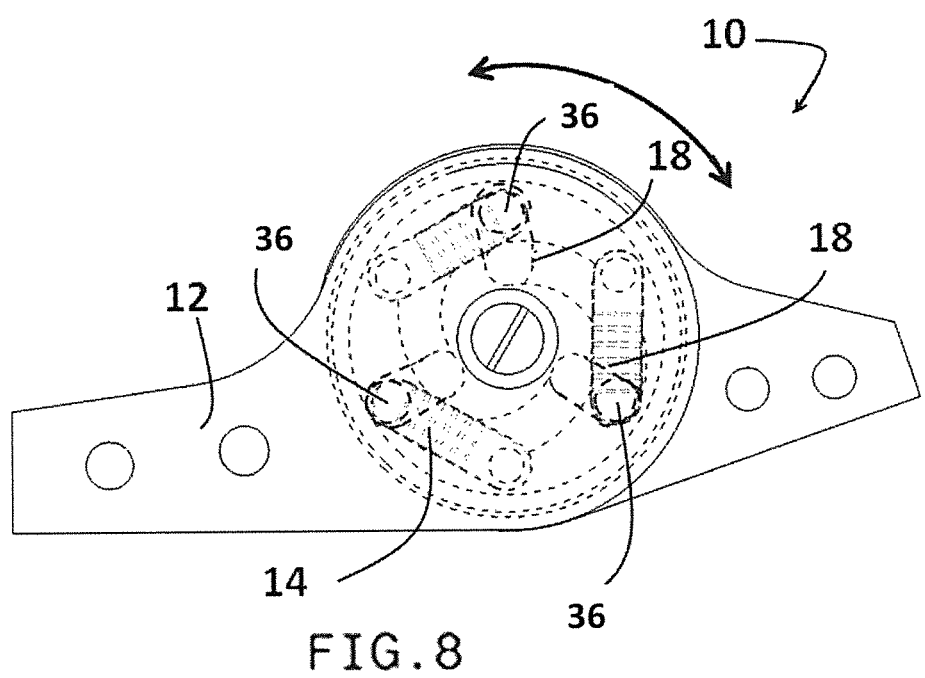
FIG. 8 is a side view of the seat reclining mechanism of FIG. 6 in a reclining position.

Referring to FIGS. 6 through 8, a further embodiment of a power disc style seat reclining mechanism 10 (also referred to seat reclining mechanism 10) is provided and shown where like features are represented by like numerals. Mechanism 10 may include a seat base mounted guide disc 12. The seat base mounted guide disc 12 may be fixed to a seat base (not shown), such as a seat base of an automotive seat. A circular ridge 20 may be formed in one end of the seat base mounted guide disc 12. A hole 24 may be formed in a central area of the circular ridge 20 that extends through a central area of base mounted guide disc 12.

Seat base mounted guide disc 12 can include at least one connection feature 22. In this example, a plurality of connection features 22 are included on seat base mounted guide disc 12. As shown in FIG. 6, the plurality of connection features can include a plurality of slots 22 and in this example, three slots 22 are provided. Slots 22 may be formed surrounding radially around the hole 24. The slots 22 may be arcuate shaped in an elongated S-shape.

Circular ridge 20 may be adapted to receive an internal disc 14. The internal disc 14 may include a center shaft 26. One end of the center shaft 26 may fit into the hole 24 in the seat base mounted guide disc 12. The other end of the center shaft 26 may pass through a seat back mounted disc 18 and continue to the other side of the seat (not shown), where a similar mechanism 10 may be disposed. Internal disc 14 can include at least one elongated slot 28. In this example, a plurality of slots 28 may be formed in the internal disc 14 and spaced apart evenly or equidistant from each other surrounding the center shaft 26. The slots 28 may align with the slots 22 in the mounted guide disc. In this example, slots 28 are elongated in a radial direction from center shaft 26 and the plurality of slots 28 include three slots 28.

In this example, a seat back mounted disc 18 is included having a circular ridge 30 and can be adapted to mate with the circular ridge 20 of the seat base mounted guide disc 12. The seat back mounted disc 18 may include a hole 32 adapted to receive the center shaft 26 of the internal disc 14. The seat back mounted disc 18 may include at least one connection feature 34 or a plurality of connection features 34. In this example, three connection features 34 are provided. The connection feature 34 can be receiving holes 34 as shown in FIG. 6. The receiving holes 34 may align in a manner to allow connection with the seat base mounted disc 12 through the internal disc 14.

Seat base mounted guide disc 12 can be connected to seat back mounted disc 18 through at least one link or linkage member 36 or a plurality of links 36. In this example, three links 36 are provided equally spaced apart from each other around hole 32. Link 36 includes a main body and a pair of linking pins 37 and 38. Linking pins 37 and 38 are spaced apart off set from each other and extending in an axial direction in opposite directions from each other. In this example, pin 37 is a load-bearing pin 27 and pin 38 is an adjustment pin 38. Load-bearing pins 37 engage seat back mounted disc 18 by engaging the connection feature 34. In this example, the pins 37 engage the holes 34. Adjustment pins 38 extend in an opposite direction to pass through the slots 28 of internal disc 14 to engage the connection features 22 of seat base mounted guide disc 12. This example, adjustment pins 38 are adjustably moveable within the slots 22 of disc 12.

The internal disc 14 may slide the adjustment pins 38 into a desired seat back position that is selected. A shoulder feature 39 formed on the body of link 36 and a washer/bushing may support the adjustment pin traveling in the slots 22 and 28. When the links 36 are driven, the mechanism may stop at the desired seat back position and the shared opposing slots act as a locking mechanism. The links 36 that are engaged into the hole 34 of the seat back mounted disc 18 may be where the focus of the load is guided, which is dispersed to the seat base mounted disc 12. The geometric travel of the motor driven internal disc 14 may have no transferred load due to the locking effect of the opposing slots 22 and holes 34 of the seat base mounted disc 12 and the seat back mounted disc 18. Pull test loads are not aligned to the rotational pivoting required to change the seat back positioning. Springs (not shown) may be added to keep the assembly counterbalanced under tension between the seat base mounted disc 12 and the seat back mounted disc 18.

FIGS. 7-8 illustrate the example of seat adjustment mechanism 10 in an upright and a reclined position. This illustrates the movement of the links within the slots 22 and 28 relative to each other.

While the above description describes a seat reclining mechanism for automotive seats, other adjustable seats may use the design of the present invention. For example, medical chairs, beds or stretchers; aerospace seats; residential seating; and commercial seating may be examples of fields where the mechanism of the present invention may be beneficial.

It should be understood, of course, that the foregoing relates to exemplary embodiments of the invention and that modifications may be made without departing from the spirit and scope of the invention as set forth in the following claims.

What is claimed is:

1. A seat reclining mechanism comprising:
a seat base mounted disc adapted to be attached to a seat base;
a seat back mounted disc adapted to be attached to a seat back;
a plurality of elongated base mounted disc slots formed in the seat base mounted disc;
a plurality of back mounted disc receiving holes formed in the seat back mounted disc;
an internal disc sandwiched between the seat back mounted disc and the seat base mounted disc, the internal disc having a plurality of elongated internal disc slots formed in the internal disc; and
a plurality of links, each link including a body, a load bearing pin and an adjustment pin, wherein the load-bearing pin and the adjustment pin are positioned offset from each other and extend in opposite axial directions and wherein the load-bearing pin engages a receiving hole from among the receiving holes of the back mounted disc, and the adjustment pin extends in an opposite direction from the load-bearing pin, passes through an elongated slot from among the elongated slots of the internal disc, and engages the seat base mounted disc through a base mounted disc slot from among the base mounted disc slots;
wherein rotation of the internal disc causes the back mounted disc to rotate relative to the base mounted disc by sliding the adjustment pins of the links along the base mounted disc slots.

2. The seat reclining mechanism of claim 1, wherein the plurality of elongated base mounted disc slots include three elongated base mounted disc slots, the plurality of back mounted disc receiving holes include three back mounted disc receiving holes, the plurality of elongated internal disc slots include three elongated internal disc slots and the plurality of links include three links, wherein each slot and hole are formed on a corresponding disc are spaced apart radially with respect to a center hole formed on the corresponding disc and are spaced equidistant from adjacent holes or slots.

3. The seat reclining mechanism of claim 1, further comprising a central shaft attached to the internal disc, the central shaft passing through the seat base mounted disc and the seat back mounted disc.

4. The seat reclining mechanism of claim 3, wherein the central shaft is adapted to be driven by a motor to adjust the position of the seat back.

5. The seat reclining mechanism of claim 3, wherein the plurality of base mounted disc slots are arcuate slots positioned around a central opening.

6. The seat reclining mechanism of claim 5, wherein the plurality of internal disc slots are positioned equidistant from each other around the central shaft and are elongated perpendicular to the central shaft.

7. The seat reclining mechanism of claim 6, wherein the plurality of back mounted disc receiving holes are spaced apart equidistant from each other around a central opening for receiving the central shaft.

8. The seat reclining mechanism of claim 1, wherein the body of the link forms a shoulder around the load-bearing pin and the adjustment pin and the shoulder is adapted to retain each pin in position.

9. The seat reclining mechanism of claim 1, wherein the body of the link is elongated and parallel with a plane defined by the seat back mounted disc and the load-bearing pin and the adjustment pin extend perpendicular with respect to the body.

10. The seat reclining mechanism of claim 1, further comprising a circular ridge on the seat base mounting disc, the circular ridge adapted to house the internal disc therewithin.

11. A seat reclining mechanism comprising:
a seat base mounted disc adapted to be attached to a seat base;
a seat back mounted disc adapted to be attached to a seat back;
a plurality of elongated base mounted disc slots formed in the seat base mounted disc;
a plurality of back mounted disc receiving holes formed in the seat back mounted disc;
an internal disc sandwiched between the seat back mounted disc and the seat base mounted disc, the internal disc having a plurality of elongated internal disc slots formed in the internal disc;
a plurality of links, each link including a body, a load bearing pin and an adjustment pin, wherein the load-bearing pin and the adjustment pin each extend in opposite direction wherein the load-bearing pin engages a receiving hole from among the receiving holes of the back mounted disc, and the adjustment pin extends in an opposite direction from the load-bearing pin, passes through an elongated slot from among the elongated slots of the internal disc, and engages the seat base mounted disc through a base mounted disc slot from among the base mounted disc slots;
a central shaft attached to the internal disc, the central shaft passing through the seat base mounted disc and the seat back mounted disc, and
wherein the base mounted disc slots, the internal disc slots and the back mounted disc receiving holes align over movement of the seat back from an upright to a reclining position, whereby rotation of the internal disc causes the back mounted disc to rotate relative to the base mounted disc by sliding the adjustment pin of the link along the slots.

12. The seat reclining mechanism of claim 11, wherein the body of the link forms a shoulder around the load-bearing pin and the adjustment pin and the shoulder is adapted to retain each pin in position; and wherein the central shaft is adapted to be driven by a motor to adjust the position of the seat back.

13. A seat reclining mechanism comprising:
a seat base mounted disc adapted to be attached to a seat base, the seat base mounted disc having a plurality of seat base connection features;
a seat back mounted disc adapted to be attached to a seat back, the seat back mounted disc having at least one seat back connection feature;
an internal disc sandwiched between the seat back mounted disc and the seat base mounted disc, the internal disc having at least one elongated internal disc slot formed in the internal disc; and
at least a link including a body and a pair of pins positioned offset from each other and extending in opposite axial directions, wherein at least one of the pins engages a seat back connection feature from among the seat back connection features and the other of the pins engages a seat base connection feature from among the seat base connection features, and one of the pins passes through the elongated internal disc slot;
wherein rotation of the internal disc causes the back mounted disc to rotate relative to the base mounted disc through the connection of the links with the connection features of the back mounted disc and the base mounted disc.

14. The seat reclining mechanism of claim 13 wherein one of the pair of pins is a load-bearing pin and the other is an adjustment pin.

15. The seat reclining mechanism of claim 14 wherein the load bearing pin engages the connection feature of the seat back mounted disc and the adjustment pin engages the seat base mounted disc and passes through the elongated internal disc slot.

16. The seat reclining mechanism of claim 14 wherein the seat base connection feature is an elongated slot for receiving the adjustment pin and the seat back connection feature is a receiving hole for receiving the load-bearing pin.

17. The seat reclining mechanism of claim 13 further comprising a plurality of elongated internal disc slots including the elongated internal disc slot, and a plurality of links including the link, wherein each connection feature and slot are formed on a corresponding disc, are spaced apart radially with respect to a center hole formed on the corresponding disc, and are spaced equidistant from adjacent connection features or slots, and wherein each link connects corresponding connection features and passes through the corresponding elongated internal disc slot.

18. The seat reclining mechanism of claim 17 wherein the plurality of seat back connection features, plurality of seat base connection features, plurality of elongated internal disc slots and plurality of links include three seat back connection features, three seat base connection features, three elongated internal disc slots, and three links.

19. The seat reclining mechanism of claim 13, further comprising a central shaft attached to the internal disc, the central shaft passing through the seat base mounted disc and the seat back mounted disc.

20. The seat reclining mechanism of claim 19, wherein the central shaft is adapted to be driven by a motor to adjust the position of the seat back.

* * * * *